March 2, 1948.  E. L. CONKEY  2,436,952
MACHINE TOOL ATTACHMENT
Filed March 1, 1945  2 Sheets-Sheet 1
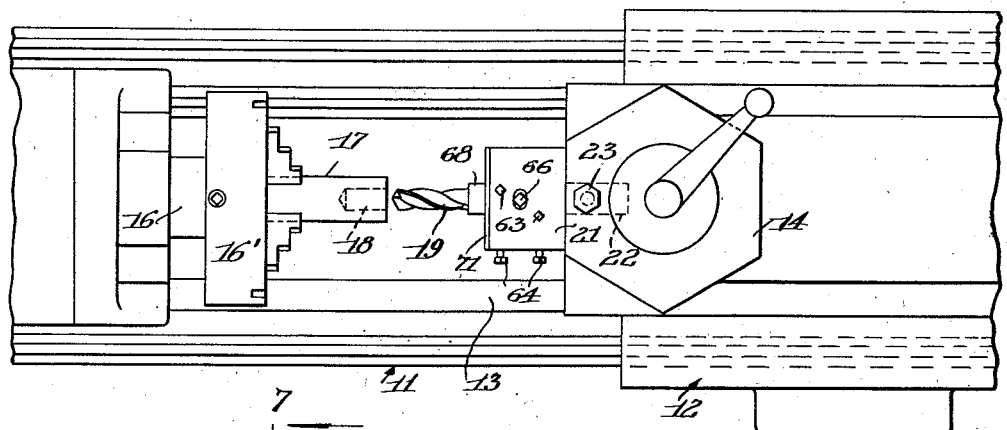
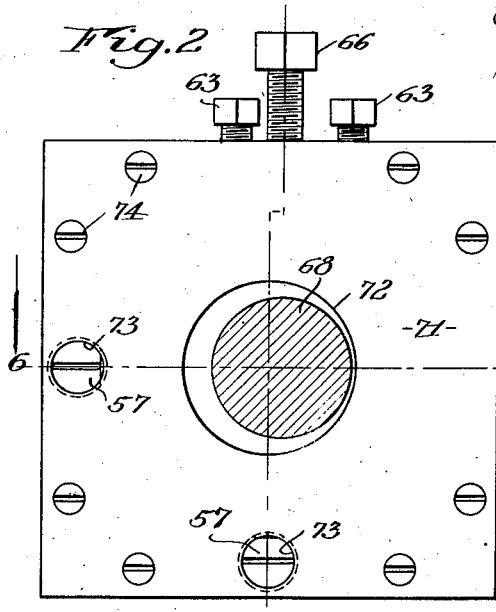
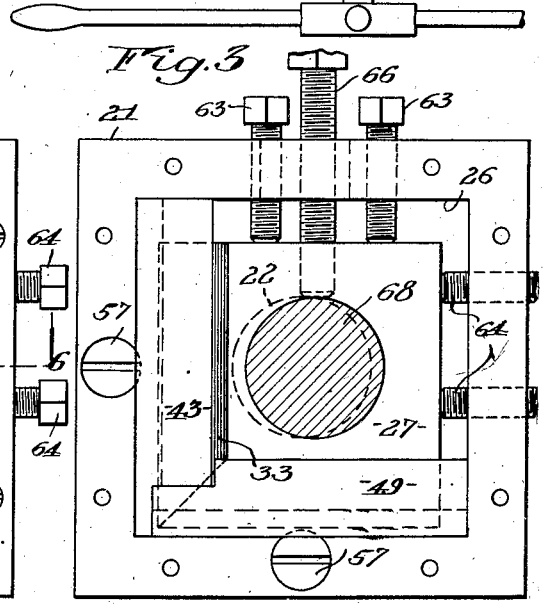
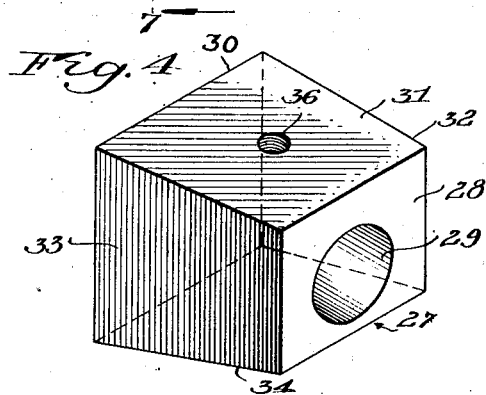
INVENTOR.
Edward L. Conkey
BY
his Attorney March 2, 1948. E. L. CONKEY 2,436,952
MACHINE TOOL ATTACHMENT
Filed March 1, 1945 2 Sheets-Sheet 2
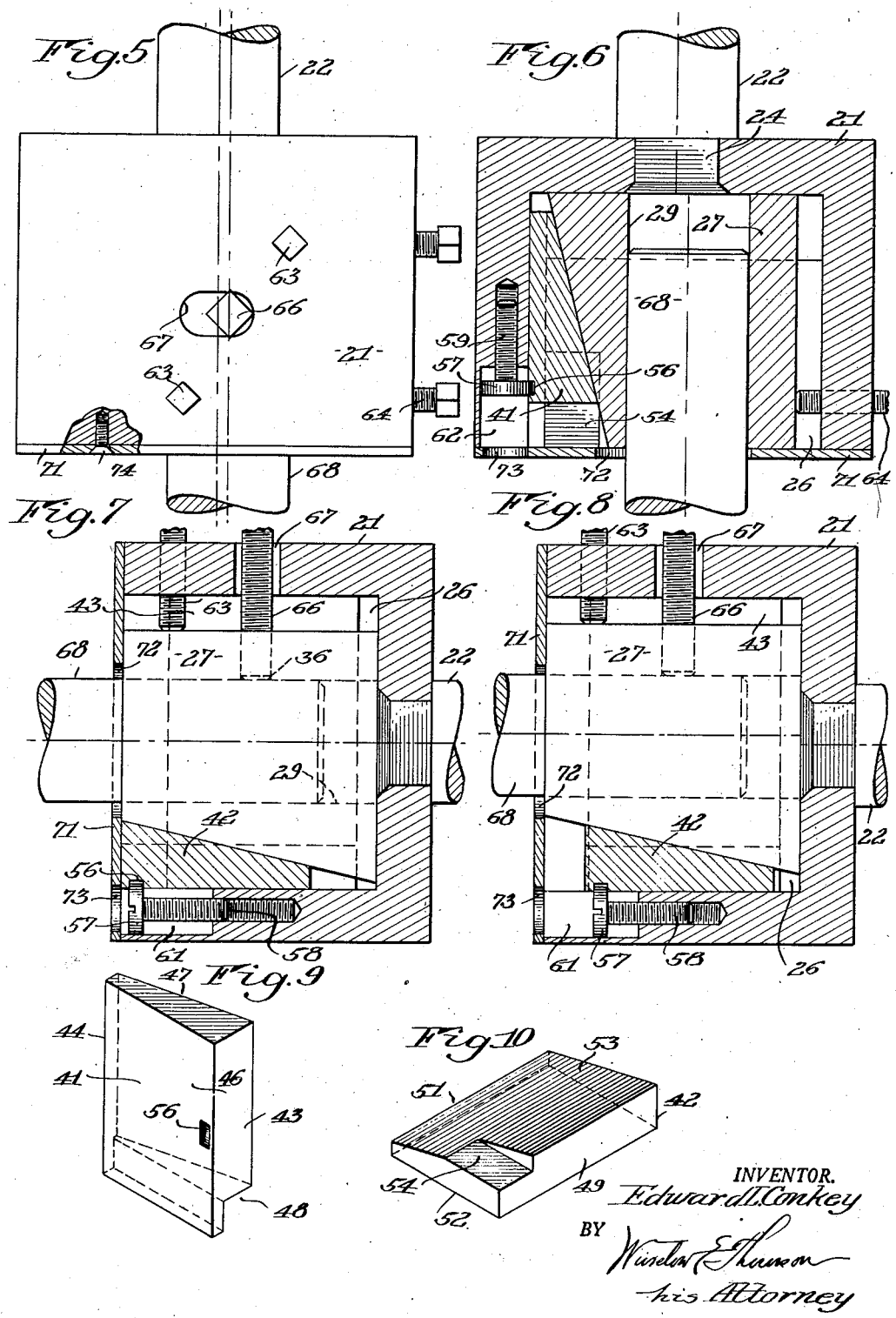
INVENTOR.
Edward L. Conkey
BY Winslow E. Lawson
his Attorney Patented Mar. 2, 1948

2,436,952

UNITED STATES PATENT OFFICE 2,436,952

MACHINE TOOL ATTACHMENT

Edward L. Conkey, Seneca Falls, N. Y.

Application March 1, 1945, Serial No. 580,317

2 Claims. (Cl. 279—6)

My invention relates to an attachment for machine tools.

An object of my invention is to provide a simple and inexpensive attachment for machine tools adapted to enable alignment of the tool and the rotatable spindle of a machine tool when the lathe bed or other parts of machine tools have become worn.

Another object of my invention is provide an attachment for a machine tool adapted to fit, for example, in the normal tool holder of a turret lathe, the attachment being provided with means for adjusting the tool so that the axis thereof may be brought into alignment with the axis of the spindle.

My invention further contemplates the provision of an attachment for a machine tool in which a block is provided for holding the tool, the block or tool holder being adjustable by means of wedges so that it may be shifted to a position such that the axis thereof is in alignment with the axis of the spindle; the attachment further being provided with means for locking or clamping the tool in such adjusted position.

Other objects and advantages of my invention will be set forth in the claims and will be apparent from the following description, when taken in connection with the accompanying drawings, in which:

Fig. 1 is a partial plan view of a machine tool, specifically a turret lathe, in which the attachment of my invention is embodied;

Fig. 2 is a face view of the machine tool attachment;

Fig. 3 is a view similar to Fig. 2 with the face plate of the attachment removed;

Fig. 4 is a view showing the adjustable block or tool holder of the attachment of my invention;

Fig. 5 is a top plan view of the attachment illustrating how the axis of the tool may be shifted out of alignment with the axis of the normal tool holder opening of the turret;

Fig. 6 is a sectional view taken substantially on the line 6—6 of Fig. 2;

Fig. 7 is a sectional view taken substantially on the line 7—7 of Fig. 2;

Fig. 8 is a view similar to Fig. 7 showing the tool in an adjusted position;

Fig. 9 is a perspective view of the vertically extending wedge for adjusting the tool holder or block;

Fig. 10 is a perspective view of the horizontal wedge for adjusting the tool holder or block.

While the attachment of my invention may be applied to various machine tools, as will be obvious to those skilled in the art, it has been shown mounted in connection with a conventional turret lathe with which my invention is particularly adapted for use.

After a period of use the bed of a lathe and other parts of a turret lathe become worn and only limited means are provided for adjusting the axis of the tool with relation to the axis of the rotating spindle so that these axes are in alignment. Such adjustments do not take care of conditions when the lathe bed, for example, is badly worn. Under such conditions, the axis of the tool can not be brought into alignment with the axis of the spindle.

As shown in the drawings, the lathe to which my invention is applied comprises a frame or housing, generally indicated by the numeral 11, a movable carriage generally indicated by the numeral 12, a lathe bed 13, a turret 14 and a rotatable spindle 16. On the spindle may be mounted a suitable chuck 16' and in the drawings I have indicated a piece of work 17, held in the chuck, in which is to be bored an opening 18 by means of a drill 19.

The turret 14 of the particular lathe shown in the drawings is provided with six sides or tool positions. Each of the hexagonal sides of the turret is provided with a bore for the reception of the shank of a tool. The attachment of my invention is adapted to be received in the normal tool holding bores of the turret. For this purpose a frame or housing 21, which is generally rectangular or square in shape, is provided with a post or shank 22 which fits in the normal tool receiving opening of the turret and is adapted to be locked or clamped in position, as indicated at 23 (Fig. 1). The shank 22 may be secured to the frame or housing 21 in any suitable manner, as indicated at 24, or may be integral therewith as desired.

The housing 21 has top, bottom, rear and side walls and is provided with an enlarged square or rectangular opening 26 in which is mounted a tool holder or block 27. The dimensions of the tool holder 27 are considerably smaller than the opening 26 so that the block may be shifted or adjusted in the opening or with respect to the inner side walls of the housing.

The tool holder is shown most clearly in Fig. 4 and has a front wall 28 and a rear wall 30 which are preferably parallel to each other and extend in planes normal to the axis of a tool receiving opening or bore 29. The tool holders are further provided with faces 31 and 32 which are at right angles to the front and rear faces and lie in planes parallel to the axis of the tool receiving opening or bore 29. The tool holder is further provided with a side face 33 and a bottom face 34 which are planary and extend at an acute angle to the axis of the bore or, in other words, the planes thereof are inclined toward the front wall 28.

The top face 31 of the tool holder or block is provided with a threaded bore 36 which connects with the bore 29 for the reception of the shank of the tool. As shown most clearly in Figs. 6 and 7, a side wedge 41 and a bottom wedge 42 are provided which are fitted into the space between the tool holding block and the housing. The wedges are shown most clearly in Figs. 9 and 10. The side wedge 41 has forward and rearward faces 43 and 44 and an outer face 46 adapted to slide on the inner side wall of the housing. The wedge further has a wedge face 47 inclined at the same angle as the face 33 and which is adapted to cooperate with the face 33 of the tool holding block. A cut-out or recess 48 is provided in the bottom of the wedge for a purpose which will later appear.

The bottom wedge 42 has forward and rearward faces 49 and 51, respectively, and a planary bottom face 52 adapted to cooperate with and slide upon the inner bottom wall of the frame. A wedge face 53 inclined at the same angle as the face 34 is adapted to cooperate with the bottom face of the tool holding block. The wedge 42 has a cut-out 54 adapted to interfit with the cut-out 48 in the wedge 41 when the parts are assembled in the frame or housing.

Each of the wedges has a recess or groove 56 for the reception of the head 57 of a cooperating screw, a screw 58 being provided for the bottom wedge and a screw 59 being provided for the side wedge. The screws 58 and 59 are threaded in the side walls of the frame or housing 21 as shown, the housing being provided with cut-out portions 61 and 62 to permit travel of the screws within the housing.

As shown most clearly in Figs. 2 and 3 a pair of set or locking screws 63 extend through the top wall of the housing and engage the top face 31 of the tool holding block. Similarly, a pair of set or locking screws 64 extend through the side wall of the housing and engage the face 32 of the tool holding block. A tool holding or clamping screw 66 extends through an elongated slot 67 (Fig. 5) in the housing and is threaded into the threaded bore 36 of the tool holding block so as to engage the shank 68 of the tool, as shown in Figs. 3 and 7.

The housing is provided with a face plate 71 having an enlarged opening 72 through which the tool extends. The face plate is also provided with openings 73 through which access to the wedge adjusting screws 58 and 59 may be had. The face plate aids in keeping chips out of the housing and may be readily removed by taking out screws 74.

When the lathe bed or other parts of the lathe become worn so that the axis of the bores for the turrets normally adapted for the reception of the shanks of the tools are out of alignment with the axis of rotation of the spindle my attachment may be employed to correct this mis-alignment. When adjustment is to be made the set screws 63 and 64 or either pair thereof, depending upon the adjustment that may be necessary, may be loosened and the wedge adjusting screws 58 and 59 or one of them actuated so as to adjust the wedges and thereby shift the tool holding block to a position such that the axis of the bore in the tool holding block is in precise alignment with the axis of the spindle.

It will be noted that the tool holding block may be raised or lowered, as illustrated in Figs. 7 and 8, or may be adjusted sidewardly as illustrated in Fig. 6. By combining both adjustments any possible position within the limits of the size of the opening in the housing of the axis of the bore may be obtained. That is, the axis of the tool receiving bore may be adjusted to any position in concentric circles with respect to the axis of rotation of the spindle.

When the proper adjustment of the wedges has been made, the set screws 63 and 64 are tightened against the tool holding block and the block is thus rigidly locked or clamped in position against shifting movement. A tool may then be placed in the tool receiving bore of the tool holder and the screw 66 forced into locking or clamping engagement with the shank of the tool.

It will be appreciated that once the tool holder has been properly aligned with respect to the spindle axis that the parts will remain in such adjusted position for a considerable length of time. Further adjustment of the tool holding block is only required when further wear of the lathe bed or other parts results in the axis of the tool being out of alignment with the axis of the spindle.

While I have shown and described the preferred form of my invention, it will be appreciated that various changes and modifications may be made therein, particularly in the form and relation of parts, without departing from the spirit of my invention as set forth in the appended claims.

I claim:

1. An attachment for a machine tool having a spindle with an axis of rotation, said attachment having a shank adapted for reception in the normal tool holding opening of the machine comprising, in combination, a housing secured to said shank, a tool holder having a bore for the reception of a tool, said tool holder having two adjacent sides which extend in planes at right angles to each other and parallel to the axis of the bore and said tool holder having two other adjacent sides which are planary and inclined with respect to the axis of the bore, a pair of wedge elements each having a wedge surface adapted to cooperate with an inclined side of said tool holder, means for adjusting said wedges to shift the tool holder so that the axis of the bore and the axis of the spindle are in alignment with each other, means extending through the housing for engaging the first two sides of the tool holder and clamping it in an adjusted position, said tool holder having a threaded opening and said housing having an elongated slot, and means extending through said elongated slot and said threaded opening for clamping the shank of a tool in said bore.

2. An attachment for a machine tool having a spindle with an axis of rotation, said attachment having a shank adapted for reception in the normal tool holding opening of the machine comprising, in combination, a housing secured to said shank, a tool holder having a bore for the reception of a tool, said tool holder having two adjacent sides which extend in planes at right angles to each other and parallel to the axis of the bore and said tool holder having two other adjacent sides which are planary and inclined with respect to the axis of the bore, a pair of wedge elements each having a wedge surface adapted to cooperate with an inclined side of said tool holder, means for adjusting said wedges to shift the tool holder so that the axis of the bore and the axis of the spindle are in alignment with each other, means extending through the housing for engaging the first two sides of the tool holder and clamping it in an adjusted position, said tool holder having a threaded opening and said housing having an elongated slot, means extending through said elongated slot and said threaded opening for clamping the shank of a tool in said bore, and a face plate for said housing, said face plate having an enlarged opening for said tool and openings through which access to the wedge adjusting means may be had.

EDWARD L. CONKEY.

REFERENCES CITED

The following references are of record in the file of this patent:

UNITED STATES PATENTS

| Number | Name | Date |
|---|---|---|
| 300,920 | Wallace | June 24, 1884 |
| 426,568 | Leverich | Apr. 29, 1890 |
| 450,234 | Johnson | Apr. 14, 1891 |
| 1,355,757 | Elliot et al. | Oct. 12, 1920 |
| 1,646,056 | Evensen | Oct. 18, 1927 |

FOREIGN PATENTS

| Number | Country | Date |
|---|---|---|
| 2,931 | Great Britain | Mar. 5, 1885 |